Figure 1:
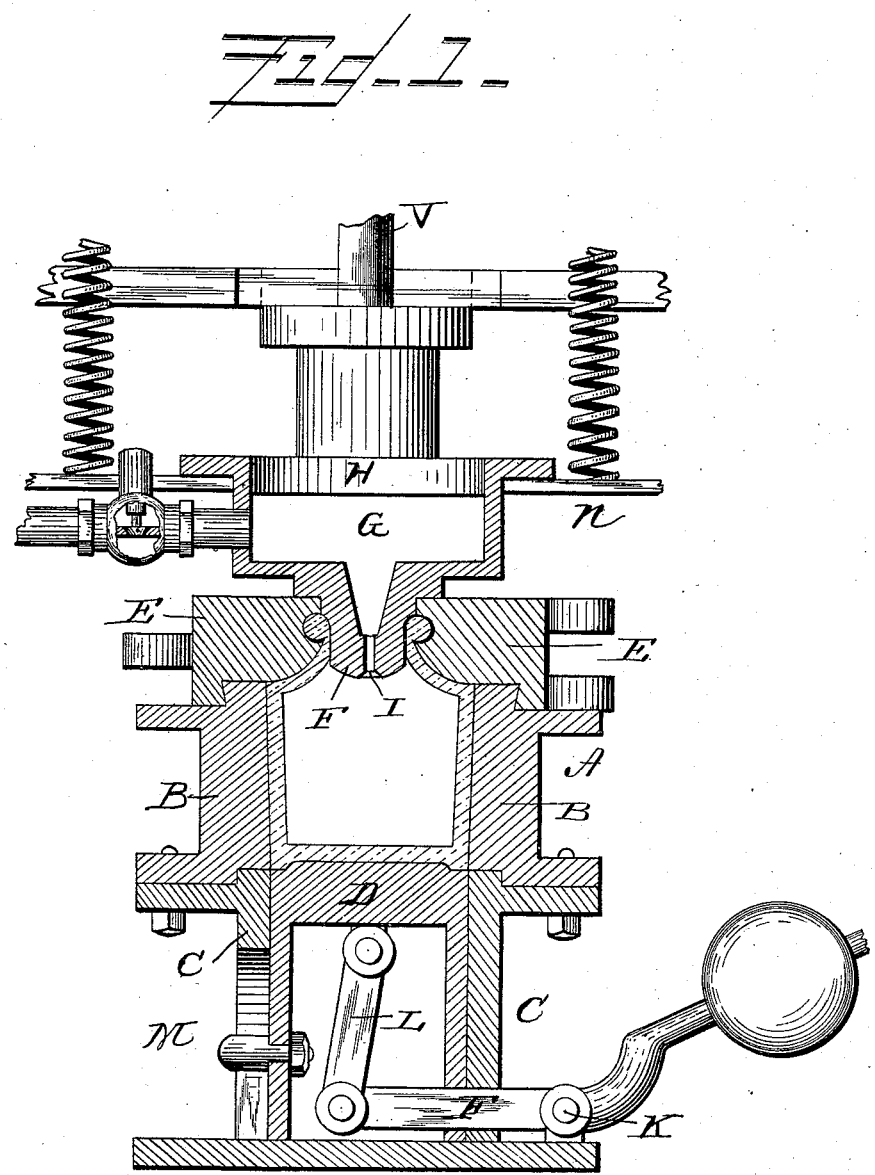

(No Model.) 4 Sheets—Sheet 1.

T. B. ATTERBURY.
DEVICE FOR MANUFACTURING HOLLOW GLASSWARE.

No. 484,131. Patented Oct. 11, 1892.

WITNESSES
F. L. Durand
H. M. Sterling

INVENTOR
Thomas B. Atterbury
by L. M. Nisabaugh
Attorney (No Model.) 4 Sheets—Sheet 2.
T. B. ATTERBURY.
DEVICE FOR MANUFACTURING HOLLOW GLASSWARE.
No. 484,131. Patented Oct. 11, 1892.
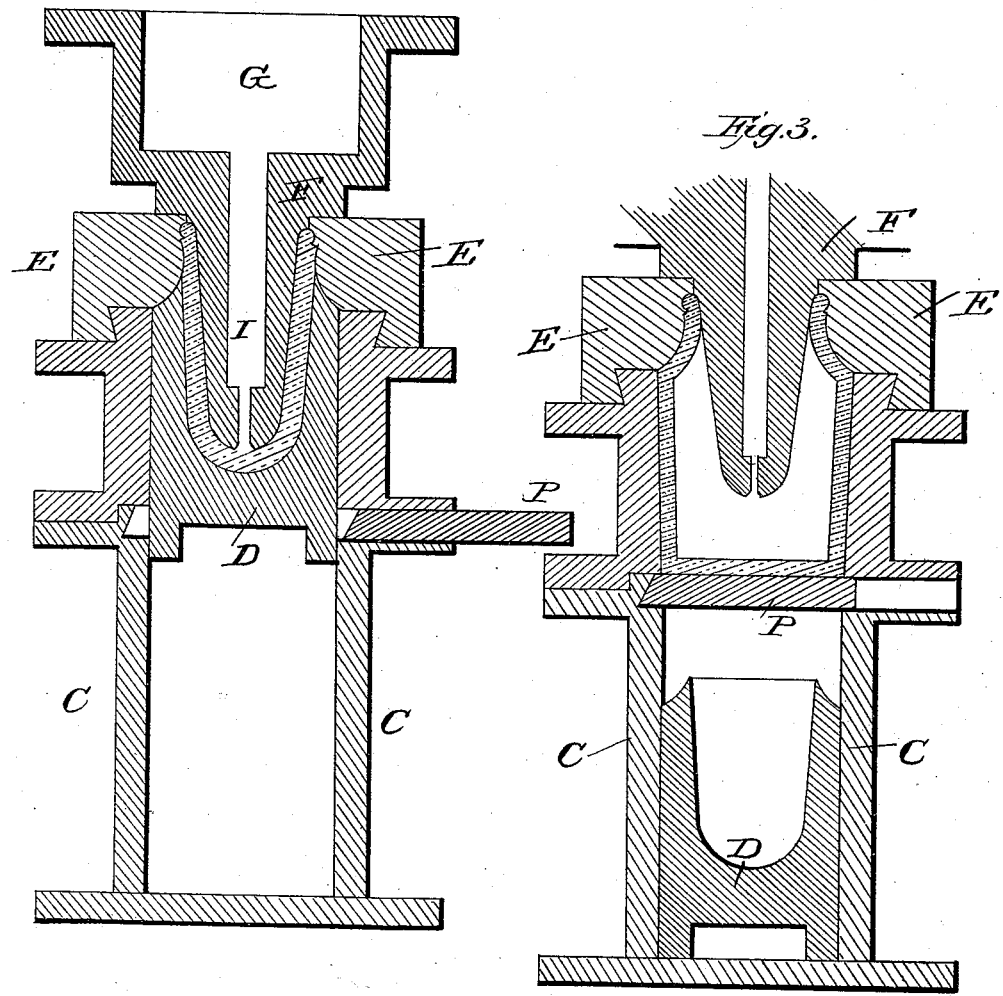
WITNESSES
F. L. Ourand
N. M. Sterling
INVENTOR
Thomas B. Atterbury
by C. M. Clisabaugh
Attorney
THE NORRIS PETERS CO., PHOTO-LITHO., WASHINGTON, D. C.

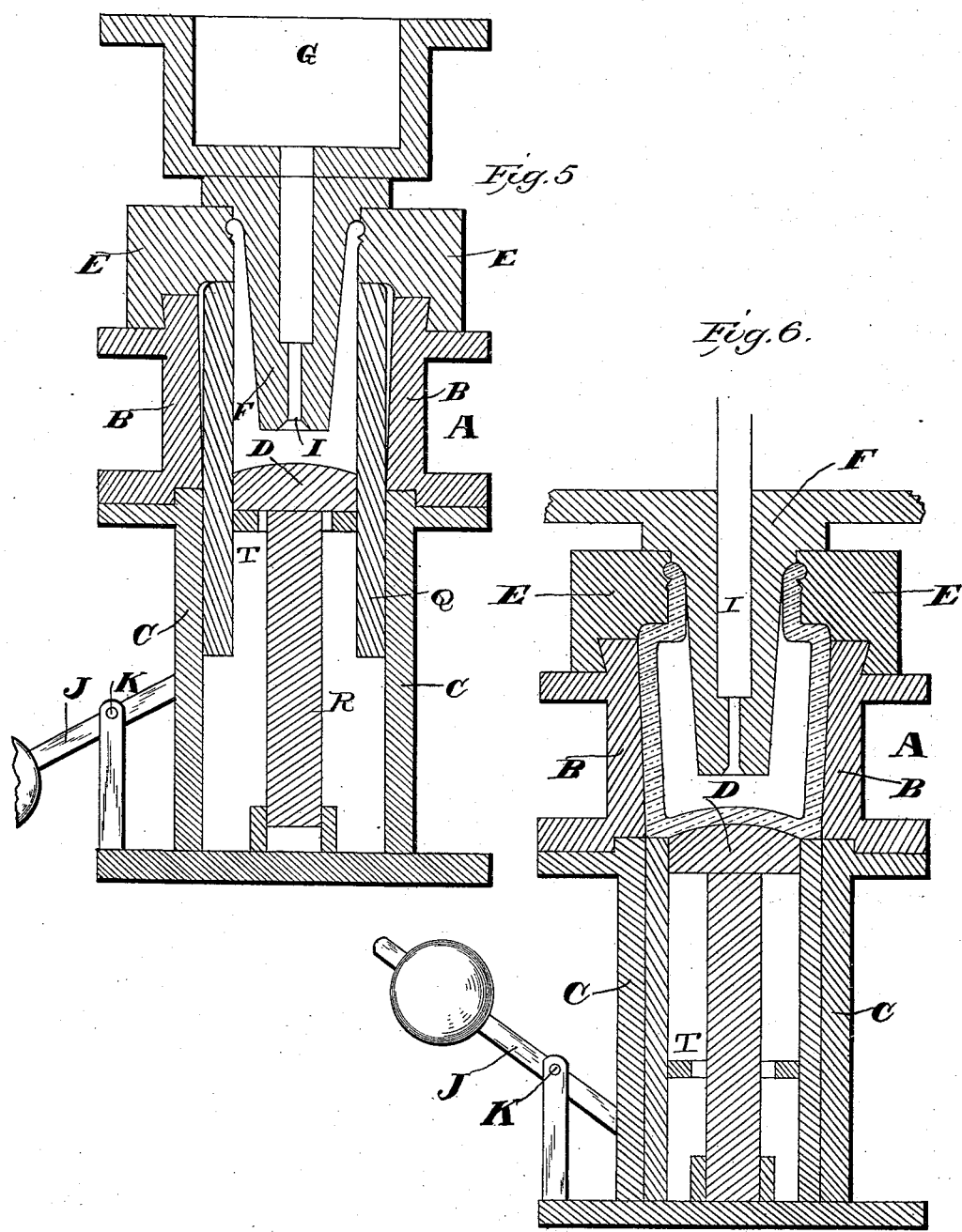

(No Model.) 4 Sheets—Sheet 4.
T. B. ATTERBURY.
DEVICE FOR MANUFACTURING HOLLOW GLASSWARE.
No. 484,131. Patented Oct. 11, 1892.
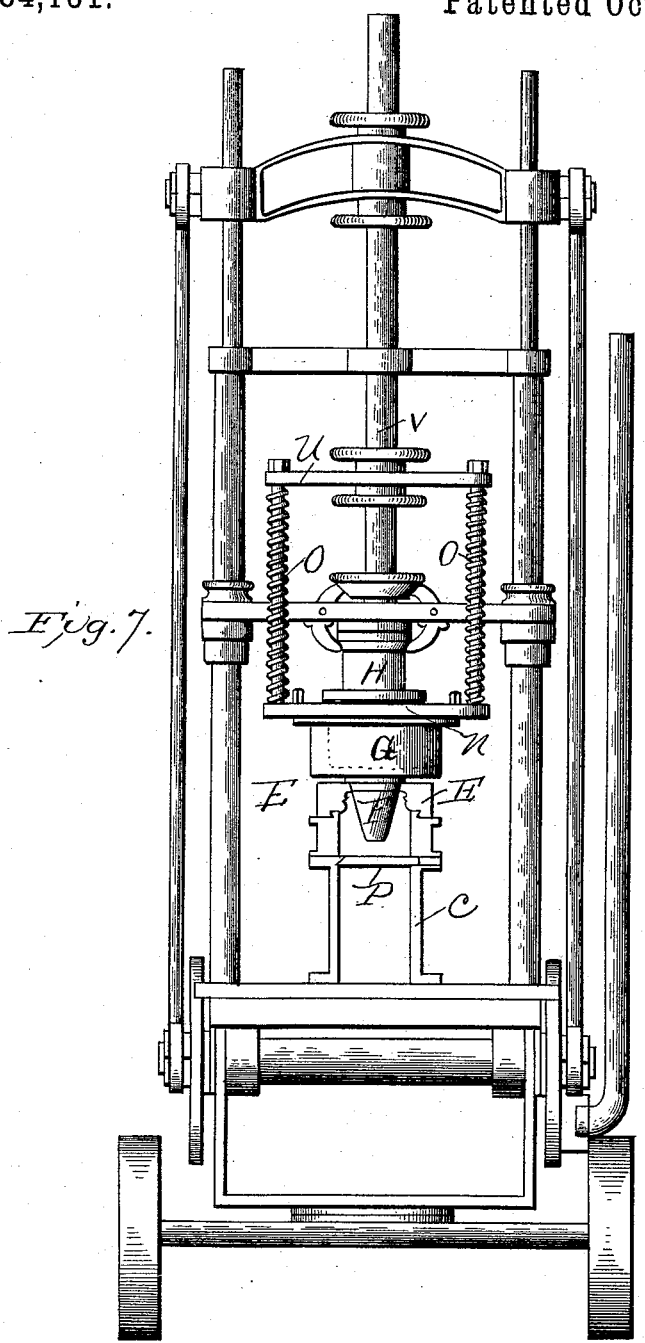

UNITED STATES PATENT OFFICE.

THOMAS B. ATTERBURY, OF PITTSBURG, PENNSYLVANIA.

DEVICE FOR MANUFACTURING HOLLOW GLASSWARE.

SPECIFICATION forming part of Letters Patent No. 484,131, dated October 11, 1892.

Application filed March 24, 1892. Serial No. 426,244. (No model.)

*To all whom it may concern:*

Be it known that I, THOMAS B. ATTERBURY, a citizen of the United States, and a resident of Pittsburg, in the county of Allegheny and State of Pennsylvania, have invented new and useful Improvements in Devices for Manufacturing Hollow Glassware; and I do hereby declare the following to be a full, clear, and exact description of said invention, reference being had to the accompanying drawings, and to the letters of reference marked thereon, which form a part of this specification.

This invention relates to certain new and useful improvements in devices for manufacturing hollow glassware, in which the glass article is mechanically blown within the mold.

In the various forms of mechanical blowers operating in conjunction with a mold the great objection has been the number of manipulations required to be made in producing the glass article, in which labor and skill are necessary requirements. The top of the article is required to be pressed before the body is blown, and after this has been accomplished a separate and distinct operation is required to blow the body portion within the mold, and this operation requires the working of a lever by hand for controlling the bottom of the mold, which is adapted to be raised and lowered as the body of the article is being blown. The presence of these several and distinct operations in the devices as at present used, and which may be seen by reference to my patent, No. 139,993, dated June 17, 1873, require not only the employment of more labor by reason thereof, but skill and time in the blowing as well, which is due to the dependency on the manual labor required in operating the movable bottom, than would be necessary if the several operations could be so combined as to form one continuous and automatic operation. It has therefore been my object to so construct a mechanical blower, combined with the mold, that the molding or pressing of the top and the blowing of the body portion will be accomplished in one operation, thus making the dependency on skill and labor of very minor importance.

The invention consists, primarily, in providing within the plunger, which enters the mold to press the top of the glass article, an air-chamber communicating with the interior of the mold, in which air-chamber is operated a piston or plunger, which is so connected with the operating parts of the press that the action is entirely automatic.

The invention further consists in automatically controlling the movable bottom of the mold, and also in certain other novel features in the arrangement and construction of parts, all as hereinafter fully set forth.

In the accompanying drawings, in which my invention is fully illustrated, Figure 1 is a transverse vertical sectional view of the device. Fig. 2 is a sectional view of a modification of my device in which the movable bottom of the mold is of different form and construction, the same being shown in its elevated position. Fig. 3 is a sectional view of the device having the modifications shown in Fig. 2, and in which the movable bottom is dropped to its lowest position and a supplemental slide-bottom inserted above it. Fig. 4 is a top or plan view of the slide-bottom. Fig. 5 is a modification of the device in which a cylindrical hollow portion open at both ends is adapted to be moved up into the mold and to reduce the mold-cavity. Fig. 6 is a similar view showing the hollow cylindrical portion in its dropped position. Fig. 7 is a front elevation of a press having my improvements applied thereto.

The mold A for giving form to the glass article is of well-known construction, being composed of the main body B, which is mounted on a suitable supporting-frame C, which serves the purpose of a casing, also, for the movable bottom D and hinged top sections E, which, together with the plunger F, give to the top of the article to be pressed the form desired.

The plunger F in the present device contains the prime feature of my invention, as the upper portion of the same is given an important enlargement and hollowed out to form an air-chamber G, in which is automatically operated a plunger H for compressing the air within the chamber G and forcing it in the unformed body of the plastic glass to extend it so that it will take the form of the mold. An aperture or central passage I is formed in the lower end of the plunger F to establish a communication between the said chamber G and the interior of the mold.

It will be seen that the operation of the compressed air within the mold is identical with that already practiced, the air being admitted after the top of the article is formed; but the novelty of the present device lies in the construction which does not require a separate storage of compressed air and which must be controlled by a separate operator, but which in the operation of bringing down the plunger to press the top before the body is formed by the automatic operation of the plunger H within the mold-plunger F, a sufficient quantity of air is displaced within the air-chamber G by the downward movement of the plunger H, which air is discharged into the plastic glass until it is made to fill the entire mold and form the body of the article.

In the operation of the plunger F and H the movable bottom D is made to change its position. Normally it is held in an elevated position within the mold, reducing thereby the cavity of the mold, so that it will be filled by the quantity of glass necessary for the article and offer the necessary resistance to the plunger F, so that the top of the article may be completely and perfectly pressed. Form is also given the body of plastic glass by this reduction of the mold-cavity, which when blown by the charge of air from the air-chamber G will take a regularity of form and fill outward to the sides of the mold as the bottom is forced to descend. As shown in the devices of this character which are at present used the movable bottom is raised and lowered by means of a hand-lever, which not only requires the constant attention and manipulation of the operator, but the exercise of considerable skill. In the present invention the raising and lowering of the bottom is automatically controlled. The lever J is fulcrumed at K, and connects with the bottom D by means of a link-arm L. On the outward-extending arm of the lever J is provided a sliding ball or weight, which by its gravity keeps the bottom D normally raised. This operation is entirely automatic, and to secure its most efficient working the bottom is provided with downward extensions or sides which guide the bottom and hold it in a horizontal position. The movement up and down of the bottom is confined within certain limits by means of a bolt adjustable in the side, working within a slot M in the casing or support C. The movable bottom thus controlled operates in conjunction with the air-compression plunger, and the operation of these co-acting parts is entirely automatic, so that the pressing of the top of the article by the downward movement of the plunger F is the only independent operation required to be made and controlled.

It will be seen that by reference to Fig. 7 the plunger F, having the air-chamber G therein, is secured to a plate N, which is held by means of spring O to the cross-head U, fastened on the center rod V of the press. This spring connection of the plunger F with the center rod permits the rod V to continue its downward stroke when the plunger F has seated itself. The purpose of this will be seen in the two motions which are necessary to be made in completing the article. To the end of the center rod is connected the air-plunger H, which normally is raised in the air-chamber G; but on the compression of the spring O, which follows after the plunger F has seated itself, the plunger H will descend into the air-chamber and force the air into the plastic glass, causing the same to fill the mold. It will also be seen that an air-pipe communicates with the chamber G, in which pipe is an automatic valve, which opens when the plunger H is raised to prevent the suction from contracting the sides of the article already blown and closed when the said plunger H is being forced within the air-chambe The valve shown performs its function automatically, and hence is very desirable; but other forms of valves can be employed.

In Figs. 2 and 3 I have shown a modification of the movable bottom. In this construction a special cavity or mold O is formed in the movable bottom D for the purpose of giving to the bulk of plastic glass an elongated rounded form, which will better adapt it for being more readily and uniformly blown. The peculiar function of this bottom D in giving form to the plastic glass before it is blown and then to have no further or secondary function, being allowed to drop from the mold and to be replaced by a sliding bottom P, gives it practically the function of a supplemental mold. In Fig. 2 the bottom of the mold D is shown in its elevated position, and in Fig. 3 its lowered or dropped position with the slides or secondary bottom P in place and ready for the blowing of the article.

A still further modification is shown in Figs. 5 and 6, in which, instead of the movable bottom, is substituted a hollow cylindrical portion Q, which fits within the mold-cavity and gives it such a reduction in size as to be readily filled by the plastic glass when the plunger F is inserted. This cylindrical reducing portion Q operates in conjunction with a bottom D, which is mounted on the support R and is adapted to be raised by the reducing-cylinder when said cylinder is raised by engaging with an interior ring T, affixed to the cylinder at a suitable point.

Having thus described my invention, what I claim, and desire to secure by Letters Patent, is—

1. In a device for the manufacture of hollow glassware, the mold in which the glass article is pressed and blown and the plunger adapted to enter said mold to press the top of the article, said plunger having an air-chamber provided therein in which operates automatically a plunger for forcing the air of said chamber into the glass article being formed, substantially as described, and for the purpose set forth.

2. In a device for manufacturing hollow glassware, the mold provided with a movable bottom held normally raised and adapted to recede as the glass article is being blown, a hollow plunger adapted to enter the said mold and press the top of the article, an air-chamber formed within the upper part of said plunger and communicating with the interior of the mold, and a plunger operating automatically within said air-chamber, substantially as described, and for the purpose set forth.

3. In a device for manufacturing hollow glassware, the mold in which the article is to be pressed and blown, having the movable bottom normally elevated by weighted lever and adapted to be forced down to its lowest limit by the expansion of the glass as it is blown, combined with a hollow plunger fitted to the mold and a plunger operated automatically within an air-chamber in the upper part of the hollow plunger, substantially as set forth.

4. In a device for the manufacture of hollow glassware, the mold in which the glass is pressed and blown, having a movable bottom operated by a lever provided with a weight to keep the bottom normally raised, said lever connecting with the bottom by means of a link connection, and a projection provided in the downward extension of the movable bottom, which said projection enters a vertical slot in the support or casing, whereby the movement of the bottom may be controlled within certain limits, substantially as described, and for the purpose set forth.

5. In a device for the manufacture of hollow glassware, the mold in which the glass is pressed and blown, the pressure-plunger secured to the center rod of the press by a yielding connection, an air-chamber formed in the upper part of said plunger, and a plunger adapted to work in said air-chamber, connected to the center rod of the press, substantially as described, and for the purpose set forth.

6. In a device for manufacturing hollow glassware, the mold in which the glass is pressed and blown, a plunger fitted to the mold and having an air-chamber in the upper portion, and a yieldingly-mounted pressure-plunger working in said chamber, substantially as specified.

In testimony whereof I affix my signature in presence of two subscribing witnesses.

THOMAS B. ATTERBURY.

Witnesses:
D. S. SALISBURY,
J. P. ATTERBURY.